US012652681B2

(12) United States Patent
Liu et al.

(10) Patent No.: US 12,652,681 B2
(45) Date of Patent: Jun. 9, 2026

(54) MULTICAST OR BROADCAST RESOURCE CONFIGURATION METHOD, INFORMATION TRANSMISSION METHOD AND RELATED DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Xiaoman Liu, Beijing (CN); Fang Xie, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 533 days.

(21) Appl. No.: 18/040,140

(22) PCT Filed: Jul. 13, 2021

(86) PCT No.: PCT/CN2021/106046
§ 371 (c)(1),
(2) Date: Jan. 31, 2023

(87) PCT Pub. No.: WO2022/028215
PCT Pub. Date: Feb. 10, 2022

(65) Prior Publication Data
US 2024/0260061 A1     Aug. 1, 2024

(30) Foreign Application Priority Data

Aug. 5, 2020     (CN) .......................... 202010780208.5

(51) Int. Cl.
*H04W 72/30* (2023.01)
*H04W 4/06* (2009.01)
*H04W 24/08* (2009.01)

(52) U.S. Cl.
CPC ............. *H04W 72/30* (2023.01); *H04W 4/06* (2013.01); *H04W 24/08* (2013.01)

(58) Field of Classification Search
CPC ........ H04W 72/30; H04W 4/06; H04W 24/08
See application file for complete search history.

(56) References Cited

U.S. PATENT DOCUMENTS

| | | | |
|---|---|---|---|
| 10,660,065 | B2 | 5/2020 | Byun |
| 2009/0168683 | A1 | 7/2009 | Franceschini |

(Continued)

FOREIGN PATENT DOCUMENTS

| | | |
|---|---|---|
| CN | 109151737 A | 1/2019 |
| CN | 110401922 A | 11/2019 |

(Continued)

OTHER PUBLICATIONS

International Search Report in the international application No. PCT/CN2021/106046, mailed on Sep. 28, 2021.

(Continued)

*Primary Examiner* — Un C Cho
*Assistant Examiner* — Alan L Lindenbaum
(74) *Attorney, Agent, or Firm* — Syncoda LLC; Feng Ma

(57) ABSTRACT

A multicast or broadcast resource configuration method includes: a DU receives relevant information of a first multicast or broadcast service that is expected to be received and that is reported by at least one terminal, sends the received relevant information to a CU, wherein the sent relevant information is used by the CU to configure resources of the first multicast or broadcast service for the (Continued)

Relevant information, that is reported by at least one terminal, of a first multicast or broadcast service that is expected to be received is received — 101

The received relevant information is sent to a CU — 102

Resource configuration information of the first multicast or broadcast service sent by the CU is received — 103

DU, and receives resource configuration information of the first multicast or broadcast service sent by the CU.

7 Claims, 7 Drawing Sheets

(56) References Cited

U.S. PATENT DOCUMENTS

| | | | |
|---|---|---|---|
| 2011/0305183 A1 | 12/2011 | Hsu | |
| 2013/0039250 A1 | 2/2013 | Hsu | |
| 2018/0302878 A1 | 10/2018 | Byun et al. | |
| 2018/0376505 A1 | 12/2018 | Zhang et al. | |
| 2019/0132708 A1 | 5/2019 | Belghoul | |
| 2019/0132790 A1 | 5/2019 | Lee | |
| 2019/0327665 A1* | 10/2019 | Geng | H04W 72/30 |
| 2020/0077287 A1* | 3/2020 | Prasad | H04W 72/30 |
| 2020/0229082 A1* | 7/2020 | Jang | H04W 76/27 |
| 2021/0385661 A1* | 12/2021 | Centonza | H04W 16/14 |
| 2022/0264383 A1* | 8/2022 | Teyeb | H04W 36/0061 |

FOREIGN PATENT DOCUMENTS

| | | |
|---|---|---|
| CN | 110636457 A | 12/2019 |
| CN | 110972328 A | 4/2020 |
| CN | 111356174 A | 6/2020 |
| CN | 111491373 A | 8/2020 |
| CN | 113645668 A | 11/2021 |
| EP | 2787786 A1 | 10/2014 |
| JP | 2019523601 A | 8/2019 |
| JP | 2019536309 A | 12/2019 |
| WO | 2012137078 A2 | 10/2012 |
| WO | 2019037779 A1 | 2/2019 |
| WO | 2019136128 A1 | 7/2019 |

OTHER PUBLICATIONS

Written Opinion of the International Search Authority in the international application No. PCT/CN2021/106046, mailed on Sep. 28, 2021.

3GPP TSG RAN Meeting #84 RP-191007, "Overview of Rel-17 work areas for NR and LTE", Huawei, HiSilicon, Newport Beach, USA, Jun. 3-6, 2019.

Supplementary European Search Report in the European application No. 21854578.8, mailed on Aug. 17, 2023, 10 pages.

Huawei et al, "WID revision: NR Multicast and Broadcast Services", 3GPP TSG RAN Meeting #88-e RP-201316, E-meeting, Jun. 29-Jul. 3, 2020, the whole document. 6 pages.

* cited by examiner

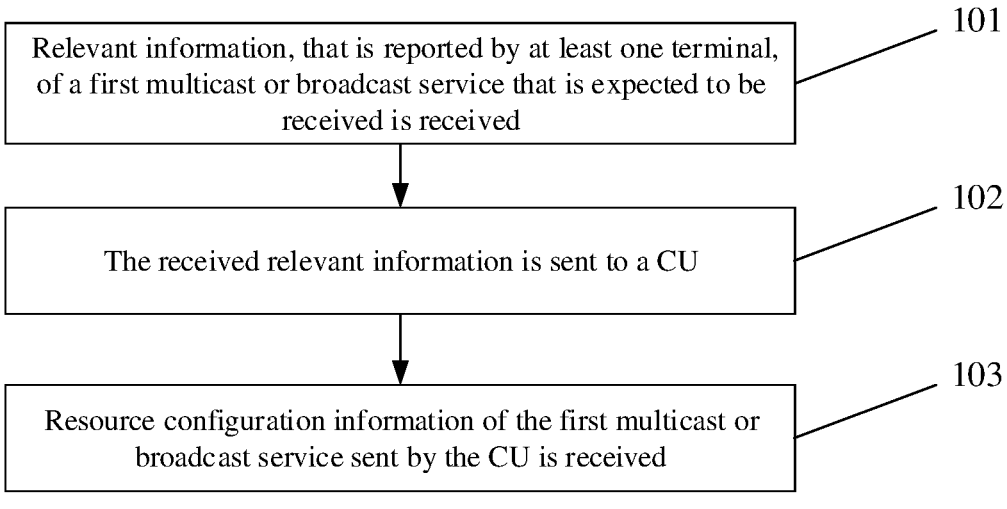

| |
|---|
| Relevant information, that is reported by at least one terminal, of a first multicast or broadcast service that is expected to be received is received — 101 |
| The received relevant information is sent to a CU — 102 |
| Resource configuration information of the first multicast or broadcast service sent by the CU is received — 103 |

FIG. 1

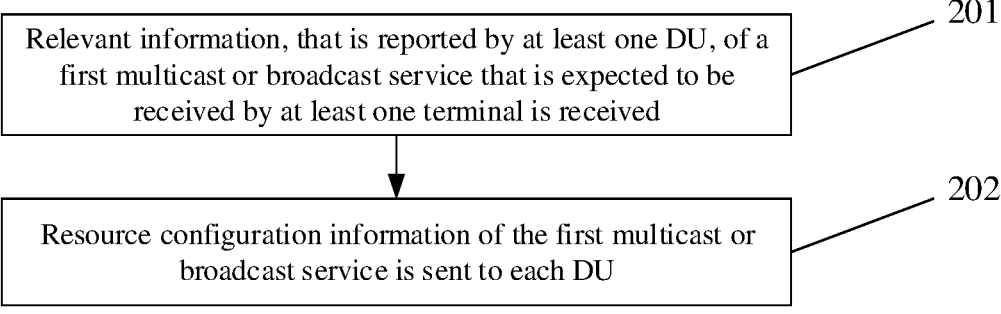

| |
|---|
| Relevant information, that is reported by at least one DU, of a first multicast or broadcast service that is expected to be received by at least one terminal is received — 201 |
| Resource configuration information of the first multicast or broadcast service is sent to each DU — 202 |

FIG. 2

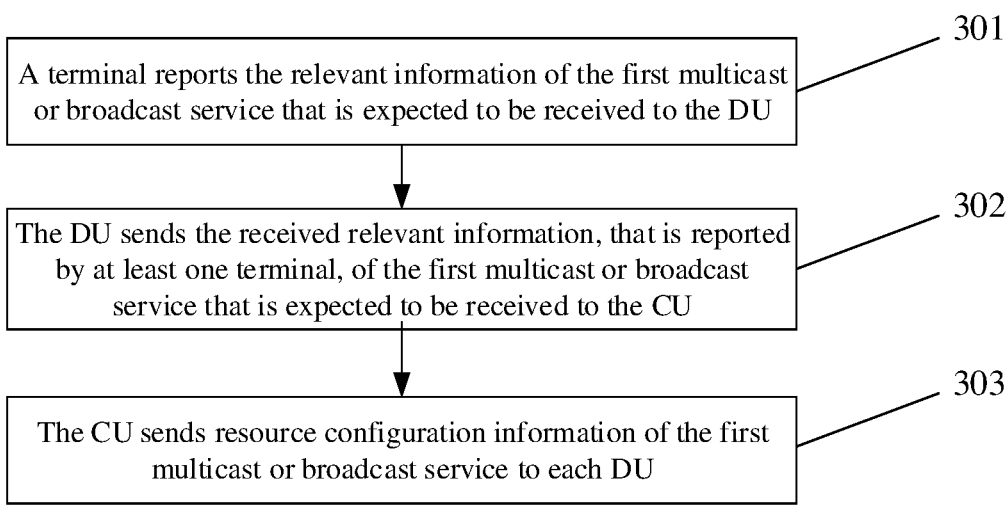

301

A terminal reports the relevant information of the first multicast or broadcast service that is expected to be received to the DU

302

The DU sends the received relevant information, that is reported by at least one terminal, of the first multicast or broadcast service that is expected to be received to the CU

303

The CU sends resource configuration information of the first multicast or broadcast service to each DU

FIG. 3

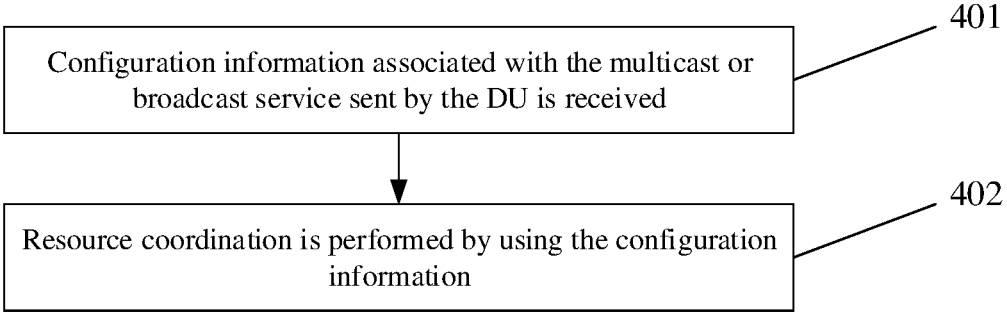

401

Configuration information associated with the multicast or broadcast service sent by the DU is received

402

Resource coordination is performed by using the configuration information

FIG. 4

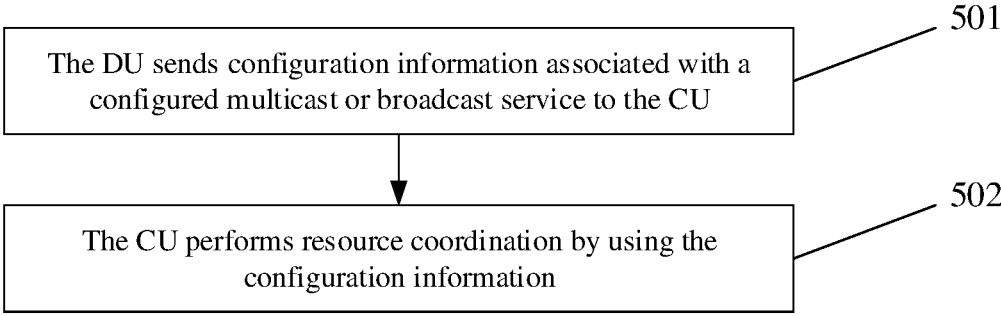

501

The DU sends configuration information associated with a configured multicast or broadcast service to the CU

502

The CU performs resource coordination by using the configuration information

FIG. 5

MULTICAST OR BROADCAST RESOURCE CONFIGURATION METHOD, INFORMATION TRANSMISSION METHOD AND RELATED DEVICE

CROSS-REFERENCE TO RELATED APPLICATIONS

This application is a National Stage of International Application No. PCT/CN2021/106046 filed on Jul. 13, 2021, which claims priority to Chinese Patent Application No. 202010780208.5, filed on Aug. 5, 2020. The disclosures of the above-referenced applications are hereby incorporated by reference in their entirety.

TECHNICAL FIELD

The present disclosure relates to the field of wireless communication, and in particular, to a multicast or broadcast resource configuration method, an information transmission method, an apparatus, a related device, and a storage medium.

BACKGROUND

In order to use mobile network resources effectively, a Multimedia Broadcast Multicast Service (MBMS) technology is proposed. The MBMS technology is a technology that transmits data from one data source to a plurality of target terminals, which achieves the sharing of resources of networks (including a core network, a transmission network (a network for transmitting electrical signals or optical signals) and an access network), and improves the utilization rate of the resources of the networks, especially the utilization rate of radio resources. Because the implementation of the MBMS technology needs special spectrum resources, and users have a low demand for mobile multimedia services, the development of this kind of services is greatly limited. Therefore, in a Long Term Evolution (LTE) system, an enhanced MBMS (eMBMS) is proposed to effectively reduce the requirements of the eMBMS for a communication system.

On the other hand, a Centralized Unit (CU)-Distributed Unit (DU) separation architecture has been introduced in New Radio (NR), which is suitable for different scenario requirements and flexibly responds to different requirements. At the same time, the CU-DU separation architecture also improves the network flexibility. Under the CU-DU separation architecture, how to support multicast or broadcast services is an urgent problem to be solved.

SUMMARY

In order to solve the related technical problems, embodiments of the present disclosure provide a multicast or broadcast resource configuration method, an information transmission method, an apparatus, a related device, and a storage medium.

The technical solutions of the embodiments of the present disclosure are implemented as follows.

The embodiments of the present disclosure provide a multicast or broadcast resource configuration method, applied to a DU, including the following operations.

Relevant information, that is reported by at least one terminal, of a first multicast or broadcast service that is expected to be received is received.

The received relevant information is sent to a CU, the relevant information sent is used to configure resources of the first multicast or broadcast service for the DU.

Resource configuration information of the first multicast or broadcast service that is sent by the CU is received.

In the above solution, the relevant information of the first multicast or broadcast service that is expected to be received and that is reported by the terminal is received in one of the following manners:

a Media Access Control Control Element (MAC CE);

physical layer signaling; or

Radio Resource Control (RRC) signaling.

In the above solution, the operation that the relevant information is sent to the CU may include the following operation.

The relevant information reported by the terminal is directly transferred to the CU without interpretation.

In the above solution, the method may further include the following operations.

Statistics is performed on the received relevant information of the first multicast or broadcast service that is reported by the at least one terminal to obtain a statistical result.

The statistical result is sent to the CU.

In the above solution, when sending the received relevant information to the CU, the method may further include the following operation.

First information is sent to the CU, the first information representing a transmission mode suggested for the first multicast or broadcast service.

In the above solution, in a case where the transmission mode suggested for the first multicast or broadcast service is a multicast mode, when sending the first information to the CU, the method may further include the following operation.

Second information is sent to the CU, the second information representing a multicast area or broadcast area suggested for the first multicast or broadcast service.

In the above solution, the method may further include the following operations.

A system information is broadcast, the system information carrying at least one piece of multicast or broadcast service information.

The relevant information of the first multicast or broadcast service that is reported by the at least one terminal based on the at least one piece of multicast or broadcast service information is received.

In the above solution, the relevant information may include at least one of the following information:

an identification of the first multicast or broadcast service;

a location of the terminal; or a receiving mode preference of the terminal.

In the above solution, the method may further include the following operation.

Resource configuration information of a second multicast or broadcast service that is configured by a network element other than the CU is sent to the CU, the sent resource configuration information is used by the CU to configure the resources of the first multicast or broadcast service for the DU.

The embodiments of the present disclosure also provide a multicast or broadcast resource configuration method, applied to a CU, including the following operations.

Relevant information of a first multicast or broadcast service that is expected to be received by at least one terminal and that is reported by at least one DU is received, the received relevant information is used to configure resources of the first multicast or broadcast service for each of the at least one DU.

Resource configuration information of the first multicast or broadcast service is sent to each DU.

In the above solution, when receiving the relevant information, that is reported by the at least one DU, of the first multicast or broadcast service that is expected to be received by the at least one terminal, the method may include the following operation.

The relevant information of the first multicast or broadcast service that is reported by the terminal and that is delivered by the DU transparently with interpretation is received.

In the above solution, when receiving the relevant information, that is reported by the at least one DU, of the first multicast or broadcast service that is expected to be received by the at least one terminal, the method may include the following operation.

A statistical result reported by the DU is received, the statistical result is obtained by performing statistics on the relevant information of the first multicast or broadcast service that is reported by the at least one terminal.

In the above solution, when receiving the relevant information, that is reported by the at least one DU, of the first multicast or broadcast service that is expected to be received by the at least one terminal, the method may further include the following operation.

First information sent by the DU is received, the first information representing a transmission mode suggested for the first multicast or broadcast service, and the first information and the received relevant information is used to configure a first multicast or broadcast service resource for each of the at least one DU.

In the above solution, in a case where the transmission mode suggested for the first multicast or broadcast service is a multicast mode, when the first information sent by the DU is received, the method may further include the following operation.

Second information sent by the DU is received, the second information representing a multicast area or broadcast area suggested for the first multicast or broadcast service, and the first information, the second information and the received relevant information is used to configure the resources of the first multicast or broadcast service for each of the at least one DU.

In the above solution, statistics is performed on the relevant information reported by the at least one DU to obtain a statistical result, the statistical result is configured to determine that the first multicast or broadcast service adopts a multicast transmission mode.

The same resources are configured for the at least one DU for the first multicast or broadcast service.

In the above solution, for each of the at least one DU, the relevant information of the first multicast or broadcast service of at least one terminal that is reported by the corresponding DU is configured to configure resources of the first multicast or broadcast service for the corresponding DU.

The resources allocated to respective DUs are different.

In the above solution, the method may further include the following operation.

Resource configuration information of a second multicast or broadcast service that is configured by a network element other than the CU and that is sent by the DU is received, the received resource configuration information and the relevant information are configured to allocate the resources of the first multicast or broadcast service to the DU.

In the above solution, the relevant information may include at least one of the following information:

an identification of the first multicast or broadcast service;
a location of the terminal; or
a receiving mode preference.

The embodiments of the present disclosure also provide a multicast or broadcast resource configuration method, applied to a terminal, including the following operation.

Relevant information of a first multicast or broadcast service that is expected to be received is reported to a DU, the reported relevant information is used by a CU to configure resources of the first multicast or broadcast service for the DU.

In the above solution, the method may further include the following operations.

A system information is received, the system information carrying at least one piece of multicast or broadcast service information.

The first multicast or broadcast service that is expected to be received is determined by using the at least one piece of multicast or broadcast service information.

In the above solution, the relevant information of the first multicast or broadcast service that is expected to be received is reported to the DU in one of the following manners:
a MAC CE;
physical layer signaling; or
RRC signaling.

In the above solution, the relevant information may include at least one of:
an identification of the first multicast or broadcast service;
a location of the terminal; or
a receiving mode preference.

The embodiments of the present disclosure provide an information transmission method, applied to a DU, including the following operation.

Configuration information associated with a configured multicast or broadcast service is sent to a CU, the configuration information is used by the CU to perform resource coordination.

In the above solution, the operation that the configuration information associated with the configured multicast or broadcast service is sent to the CU may include the following operation.

The configuration information is actively sent to the CU.
Alternatively,
the configuration information is sent to the CU in response to a request of the CU.

The embodiments of the present disclosure provide an information transmission method, applied to a CU, including the following operations.

Configuration information associated with a multicast or broadcast service sent by a DU is received.

Resource coordination is performed by using the configuration information.

In the above solution, the operation that the configuration information associated with the multicast or broadcast service sent by the DU is received may include the following operation.

The configuration information actively sent by the DU is received.
Alternatively,
a request is sent to the DU. The configuration information which is sent by the DU in response to the request is received.

The embodiments of the present disclosure also provide a multicast or broadcast resource configuration apparatus, which may include: a first receiving unit, a first sending unit, and a second receiving unit.

The first receiving unit may be configured to receive relevant information, that is reported by at least one terminal, of a first multicast or broadcast service that is expected to be received.

The first sending unit may be configured to send the received relevant information to a CU, the relevant information sent is used by the CU to configure resources of the first multicast or broadcast service for the DU.

The second receiving unit may be configured to receive resource configuration information of the first multicast or broadcast service that is sent by the CU.

The embodiments of the present disclosure also provide a multicast or broadcast resource configuration apparatus, which may include: a third receiving unit and a configuration unit.

The third receiving unit may be configured to receive relevant information of a first multicast or broadcast service that is expected to be received by at least one terminal and that is reported by at least one DU.

The configuration unit may be configured to send resource configuration information of the first multicast or broadcast service to each DU.

The embodiments of the present disclosure also provide a multicast or broadcast resource configuration apparatus, which may include: a reporting unit.

The reporting unit may be configured to report relevant information of a first multicast or broadcast service that is expected to be received to a DU, the reported relevant information is used by a CU to configure resources of the first multicast or broadcast service for the DU.

The embodiments of the present disclosure provide an information transmission method, which may include: a second sending unit.

The second sending unit may be configured to send configuration information associated with a configured multicast or broadcast service to a CU, the configuration information is used by the CU to perform resource coordination.

The embodiments of the present disclosure provide an information transmission method, which may include: a fifth receiving unit and a coordination unit.

The fifth receiving unit may be configured to receive configuration information associated with a multicast or broadcast service sent by a DU.

The coordination unit may be configured to perform resource coordination by using the configuration information.

The embodiments of the present disclosure also provide a DU, which may include: a first processor and a first communication interface.

The first communication interface may be configured to: receive relevant information, that is reported by at least one terminal, of a first multicast or broadcast service that is expected to be received; send the received relevant information to a CU, the relevant information sent is used by the CU to configure resources of the first multicast or broadcast service for the DU; and receive resource configuration information of the first multicast or broadcast service that is sent by the CU.

Alternatively, the first communication interface may be configured to send configuration information associated with a configured multicast or broadcast service to a CU, the configuration information is used by the CU to perform resource coordination.

The embodiments of the present disclosure also provide a CU, which may include: a second processor and a second communication interface.

The second communication interface may be configured to receive relevant information of a first multicast or broadcast service that is expected to be received by at least one terminal and that is reported by at least one DU; and send resource configuration information of the first multicast or broadcast service to each DU.

Alternatively, the second communication interface may be configured to receive configuration information associated with a multicast or broadcast service sent by the DU. The second processor may be configured to perform resource coordination by using the configuration information.

The embodiments of the present disclosure also provide a terminal, which may include: a third processor and a third communication interface.

The third communication interface may be configured to report relevant information of a first multicast or broadcast service that is expected to be received to a DU, the reported relevant information is used by a CU to configure resources of the first multicast or broadcast service for the DU.

The embodiments of the present disclosure also provide a DU, which may include: a first processor and a first memory configured to store a computer program executable on the processor.

The first processor may be configured to execute the steps of any method on a DU side when running the computer program.

The embodiments of the present disclosure also provide a CU, which may include: a second processor and a second memory configured to store a computer program executable on the processor.

The second processor may be configured to execute the steps of any method on a CU side when running the computer program.

The embodiments of the present disclosure also provide a terminal, which may include: a third processor and a third memory configured to store a computer program executable on the processor.

The third processor may be configured to execute the steps of any method on a terminal side when running the computer program.

The embodiments of the present disclosure also provide a storage medium on which a computer program is stored. The computer program, when executed by a processor, implements the steps of any method on the DU device side, or implements the steps of any method on the CU side, or implements the steps of any method on the terminal side.

In the multicast or broadcast resource configuration method, the information transmission method, the apparatus, the related device, and the storage medium provided by the embodiments of the present disclosure, the terminal reports the relevant information of the first multicast or broadcast service that is expected to be received to the DU; the DU sends the received relevant information to the CU; the CU configures the resources of the first multicast or broadcast service for each of the at least one DU by using the received relevant information, and the DU receives the resource configuration information of the first multicast or broadcast service that is sent by the CU. The terminal reports the relevant information of the first multicast or broadcast service that is expected to be received to the DU, the DU sends the relevant information reported by the terminal to the CU, and the CU sends the resource configuration information of the multicast or broadcast service to each DU, so that the configuration of the resources of the multicast or broadcast service under a CU-DU architecture is implemented, and the resources of the multicast or broadcast service are configured based on the requirements of the terminal for the multicast or broadcast service. In this way, the resource waste is reduced. At the same time, the DU sends the configuration information associated with the configured multicast or broadcast service to the CU, and the CU performs resource coordination by using the configuration information, so that the dynamic adjustment of a sending mode and a sending area of the multicast or broadcast service is realized, thereby reducing the resource waste.

BRIEF DESCRIPTION OF THE DRAWINGS

FIG. 1 is a flowchart of a multicast or broadcast resource configuration method according to an embodiment of the present disclosure.

FIG. 2 is a flowchart of another multicast or broadcast resource configuration method according to an embodiment of the present disclosure.

FIG. 3 is a flowchart of a third multicast or broadcast resource configuration method according to an embodiment of the present disclosure.

FIG. 4 is a flowchart of an information transmission method according to an embodiment of the present disclosure.

FIG. 5 is a flowchart of another information transmission method according to an embodiment of the present disclosure.

DETAILED DESCRIPTION

Figure 6:
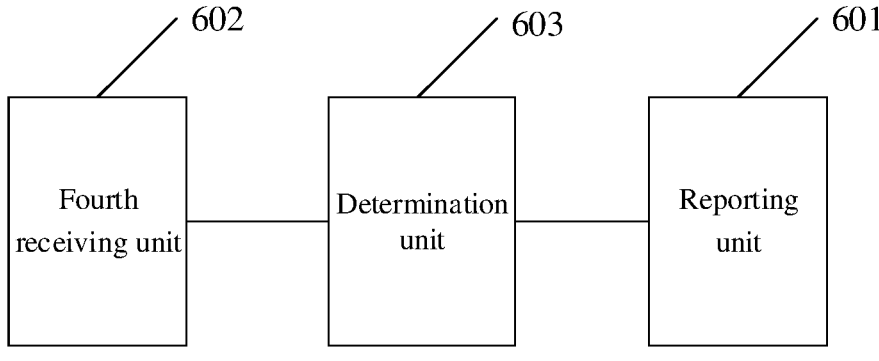
FIG. 6 is a schematic structural diagram of a multicast or broadcast resource configuration apparatus according to an embodiment of the present disclosure.

The present disclosure is elaborated in detail below with reference to the drawings and embodiments.

Under a CU-DU separation architecture, it is necessary to consider the configuration of resources for multicast or broadcast, the specific functions of a CU and a DU considering multicast or broadcast, and the information interaction among the CU, the DU and the User Equipment (UE), etc. In particular, it is necessary to consider the receiving interests of the UE in a multicast or broadcast service (also be understood as a preference), and to consider information such as a geographical location of the UE to perform multicast configuration, for example, the adjustment of a multicast area and the adjustment of a multicast service transmission mode (e.g., Point to Point (PTP) or Point to Multipoint (PTM)).

Based on this, in some embodiments of the present disclosure, a terminal reports relevant information of a preferred multicast or broadcast service to the DU, the DU sends the relevant information of the multicast or broadcast service of the terminal to the CU, and the CU allocates resources to a certain multicast or broadcast service based on the relevant information sent by the DU.

The embodiments of the present disclosure provide a multicast or broadcast resource configuration method, applied to a terminal, includes the following operation.

Relevant information of a first multicast or broadcast service that is expected to be received is reported to a DU, the reported relevant information is used by a CU to configure resources of the first multicast or broadcast service for the DU.

Here, in practical application, the terminal may be referred to as UE or a user, etc.

The terminal may report the relevant information of the multicast or broadcast service that is expected to be received based on the requests of a network side (such as the requests of the CU or DU) or based on the configuration.

Based on this, in an embodiment, the method may further include the following operations.

A system information is received, the system information carrying at least one piece of multicast or broadcast service information.

The first multicast or broadcast service that is expected to be received is determined by using the at least one piece of multicast or broadcast service information.

The terminal receives the system information sent by the DU.

That is, the terminal receives a broadcast information sent by the DU, the broadcast information containing a reception situation of a terminal expected to be obtained by a network (a multicast or broadcast service being received) or a multicast or broadcast service list based on interest feedback (a multicast or broadcast service that is expected to be received or to be received).

The relevant information of the first multicast or broadcast service that is expected to be received is reported to the DU based on the broadcast system information.

In practical application, the CU may configure the DU to broadcast the system information.

Here, in the related art, the eMBMS introduces three logical network elements on the basis of an LTE architecture: a multi-cell/Multicast Coordination Entity (MCE) is introduced to the access network side, an MBMS Gateway (MBMSGW) and a Broadcast-Multicast Service Center (BM-SC) are introduced to the core network side, and six interfaces (M1, M2, M3, Sm, SGmb and Sci-mb) are added accordingly.

However, the minimum granularity of a multicast area or broadcast area of the MBMS under the LTE architecture is a cell, and in this case, for a certain multicast or broadcast service, there are only two states in a certain cell, namely, the whole cell sends or the whole cell does not send, but multicast or broadcast is not performed in different areas of the cell, and therefore the flexibility is poor, and the resource waste is also caused. Moreover, with the development of wireless systems and the system bandwidth increasing, the resource waste becomes more and more serious. On the other hand, for a 5th Generation Mobile Communication Technology (5G) system, a beam switching mode is used for data sending, so that the configuration and sending of the multicast or broadcast service based on the beam switching mode, and the adjustment of a sending beam of the multicast or broadcast service performed according to the distribution of users in the cell, etc., may be considered.

Therefore, the multicast or broadcast service (i.e., at least one multicast or broadcast service) in the multicast or broadcast service list may be based on cell granularity or beam granularity.

Based on this, in an embodiment, the at least one piece of multicast or broadcast service information includes at least one of:

multicast or broadcast service information provided by a current serving frequency;

multicast or broadcast service information provided by a current serving cell;

multicast or broadcast service information provided by each beam of the current serving cell;

multicast or broadcast service information provided by an adjacent frequency of the current serving frequency;

multicast or broadcast service information provided by a neighbor cell; and multicast or broadcast service information provided by each beam of the neighbor cell.

In an embodiment, the relevant information may include at least one of the following information:

an identification of the first multicast or broadcast service;

a location of the terminal; or a receiving mode preference.

In practical application, the identification of the first multicast or broadcast service may include one or more of an area ID, a Temporary Mobile Group Identity (TGMI), a session ID, a QoS flow ID, and a Service Area Identification (SAI) of the first multicast or broadcast service.

The location of the terminal may include one or more of a Synchronization Signal Block (SSB) ID, a Channel State Information-Reference Signal (CSI-RS) ID, a Physical Cell identifier (PCI), latitude and longitude, or other information representing the location.

For the receiving mode preference, 1 bit is used to indicate whether the first multicast or broadcast service is expected to be received through multicast (also understood as the PTM). For example, setting to 1 indicates that the first multicast or broadcast service is expected to be received in a multicast mode, and setting to 0 indicates that the first multicast or broadcast service is not expected to be received in a multicast mode.

In practical application, it may be independently set for a certain multicast or broadcast service fed back, or it may be uniformly set for the multicast or broadcast service fed back.

In another embodiment, the method may further include the following operations.

RRC signaling (such as a counting message) sent by the DU is received, the RRC signaling containing a reception situation of a terminal expected to be obtained by a network or a multicast or broadcast service list based on interest feedback.

The relevant information of the first multicast or broadcast service that is expected to be received is reported to the DU based on the received RRC signaling.

That is, after the RRC signaling is received, a terminal in a connected state feeds back the relevant information of the first multicast or broadcast service that is expected to be received through an uplink RRC message according to a form content required by the network, etc.

In practical application, when the terminal reports the relevant information of the multicast or broadcast service that is expected to be received based on the requests of the network side, the reported relevant information (i.e., the feedback content and form) needs to be consistent with the requests of the network side, namely, consistent with the requests of the network side.

The multicast or broadcast service that is expected to be received by the terminal, or may be a multicast or broadcast service being received by the terminal, and may also be a multicast or broadcast service that the terminal is interested in. In practical application, the terminal determines the interested multicast or broadcast service according to the selection of the user. In a case where the multicast or broadcast service that is expected to be received by the terminal is the multicast or broadcast service being received by the terminal, the CU reallocates the resources to the multicast or broadcast service when implementing the solution of the present disclosure.

In an embodiment, the terminal reports the relevant information of the first multicast or broadcast service that is expected to be received to the DU in one of the following manners:

a MAC CE;

physical layer signaling; or

RRC signaling.

Herein, when the terminal is in an RRC_idle state or an RRC_inactive state, namely, for the terminal in the idle state or the inactive state, the relevant information of the first multicast or broadcast service that is expected to be received is reported to the DU through the MAC CE or physical layer signaling.

When the terminal is in an RRC_connected state, namely, for the terminal in the connected state, the relevant information of the first multicast or broadcast service that is expected to be received is reported to the DU through the RRC signaling.

Here, in practical application, the physical layer signaling may be Uplink Control Information (UCI) such as a Scheduling Request (SR) or a Channel Quality Indicator (CQI).

The RRC signaling may be an MBMS Counting Response message) (or, of course, a message of another name that has the same role as this message), or an MBMS Interest message (MBMS Interest Indication) or an RRC Connection Reconfiguration Complete message (which may also be referred to as an RRC Reconfiguration Complete message), etc.

After reporting the relevant information of the first multicast or broadcast service that is expected to be received to the DU, the terminal performs corresponding processing.

Based on this, the embodiments of the present disclosure also provide a multicast or broadcast resource configuration method, applied to a DU, as shown in FIG. 1, the method includes the following operations.

At S101, relevant information, that is reported by at least one terminal, of a first multicast or broadcast service that is expected to be received is received.

At S102, the received relevant information is sent to a CU, the relevant information sent is used by the CU to configure resources of the first multicast or broadcast service for the DU.

At S103, resource configuration information of the first multicast or broadcast service that is sent by the CU is received.

In an embodiment, in S101, the DU receives the relevant information of the first multicast or broadcast service that is expected to be received and that is reported by the terminal in one of the following manners:

an MAC CE;

physical layer signaling; or

RRC signaling.

Here, in an embodiment, the method may further include the following operations.

A system information is broadcast, the system information carrying at least one piece of multicast or broadcast service information.

The relevant information of the first multicast or broadcast service that is reported by the at least one terminal based on the at least one piece of multicast or broadcast service information is received.

In practical application, in S102, after the DU receives the relevant information reported by the terminal, the relevant information reported by the terminal is directly delivered to the CU without interpretation.

Specifically, when the terminal reports the relevant information through the MAC CE, physical layer signaling or RRC signaling, the DU directly delivers the signaling to the CU without interpretation.

After receiving the relevant information reported by the terminal, the DU may also perform statistics on the relevant information reported by a plurality of terminals.

Based on this, in an embodiment, the method may further include the following operations.

Statistics is performed on the received relevant information of the first multicast or broadcast service that is reported by the at least one terminal to obtain a statistical result.

The statistical result is sent to the CU.

In practical application, when the terminal reports the relevant information through the MAC CE or physical layer signaling, statistics is performed on the relevant information of the first multicast or broadcast service that is reported by these terminals to obtain the statistical result.

In practical application, the DU receives the relevant information for different multicast or broadcast services reported by the plurality of terminals, and at this time, statistics is performed with the multicast or broadcast services as granularity within a set statistical period.

Statistics is also performed with a beam as granularity, such as an SSB as granularity within the set statistical period.

Statistics is also performed with a cell as granularity within the set statistical period y.

That is, statistics is performed with at least one of the multicast or broadcast service, the SSB and the cell as granularity within the set statistical period.

In practical application, the DU also sends a suggestion for a transmission mode of the first multicast or broadcast service to the CU.

Based on this, in an embodiment, the method may further include the following operation.

First information is sent to the CU, the first information representing a transmission mode suggested for the first multicast or broadcast service.

The suggested transmission mode is a multicast (i.e., PTM) or unicast (i.e., PTP) mode.

Here, for the multicast or broadcast service that is suggested to be transmitted in a multicast mode by the DU, the suggestion or request message sent by the DU to the CU may contain an identification of the multicast or broadcast service (such as one or more of the TMGI, SAI, session ID, QoS flow ID, and a multicast IP address), and may contain a multicast area or broadcast area (such as a certain cell, or an area corresponding to a certain beam of a certain cell) suggested for the multicast or broadcast service.

Based on this, in a case where the transmission mode suggested for the first multicast or broadcast service is a multicast mode, when the first information sent to the CU, the method may further include the following operation.

Second information is sent to the CU, the second information representing a multicast area or broadcast area suggested for the first multicast or broadcast service.

In practical application, when a network management device or a control unit other than the CU directly configures resources required for transmission of the multicast or broadcast service, etc., the DU sends configuration information of the resources of the multicast or broadcast service to the CU, so that the CU schedules the resources reasonably to avoid conflicts with the resources configured by the network management device or the control unit other than the CU.

Based on this, in an embodiment, the method may further include the following operation.

Resource configuration information of a second multicast or broadcast service that is configured by a network element other than the CU is sent to the CU, the resource configuration information sent is used by the CU to configure the resources of the first multicast or broadcast service for the DU.

In practical application, the DU selects to send all or part of the configuration issued by the network management device or the control unit other than the CU to the CU, that is, the number of the second multicast or broadcast services is at least one.

The sending may be either actively initiated by the DU or requested by the CU.

Based on this, in an embodiment, the operation that the resource configuration information of the second multicast or broadcast service that is configured by the network element other than the CU is sent to the CU includes the following operation.

The resource configuration information is actively sent to the CU.

Alternatively, the resource configuration information is sent to the CU in response to a request of the CU.

After receiving the information reported by the DU, the CU allocates the resources to the first multicast or broadcast service.

Based on this, the embodiments of the present disclosure also provide a multicast or broadcast resource configuration method, applied to a CU, as shown in FIG. 2, the method includes the following operations.

At S201, relevant information of a first multicast or broadcast service that is expected to be received by at least one terminal and that is reported by at least one DU is received.

At S202, resource configuration information of the first multicast or broadcast service is sent to each DU.

In practical application, a decision unit configures the resources of the multicast or broadcast service for each DU. When the decision unit is located on the CU, the CU configures the resources of the first multicast or broadcast service for each of the at least one DU by using the received relevant information. When the decision unit is located on another hardware device independent from the CU, the decision unit needs to send the resource configuration information to the CU, and the CU sends, for example, the CU delivers without interpretation, the resource configuration information to the DU.

In an embodiment, when receiving the relevant information, that is reported by the at least one DU, of the first multicast or broadcast service that is expected to be received by the at least one terminal, the method may further include the following operation.

The relevant information of the first multicast or broadcast service that is reported by the terminal and that is delivered by the DU without interpretation is received.

When receiving the relevant information, that is reported by the at least one DU, of the first multicast or broadcast service that is expected to be received by the at least one terminal, the method may further include the following operation.

A statistical result reported by the DU is received, the statistical result is obtained by performing statistics on the relevant information of the first multicast or broadcast service that is reported by the at least one terminal.

In an embodiment, when receiving the relevant information, that is reported by the at least one DU, of the first multicast or broadcast service that is expected to be received by the at least one terminal, the method may further include the following operations.

First information sent by the DU is received, the first information representing a transmission mode suggested for the first multicast or broadcast service, and the first information and the received relevant information is used to configure a first multicast or broadcast service resource for each of the at least one DU.

Accordingly, the CU configures the resources of the first multicast or broadcast service for each of the at least one DU according to the first information and the received relevant information.

In an embodiment, in a case where the transmission mode suggested for the first multicast or broadcast service is a multicast mode, when the first information sent by the DU is received, the method may further include the following operations.

Second information sent by the DU is received, the second information representing a multicast area or broadcast area suggested for the first multicast or broadcast service, and the first information, the second information and the received relevant information is used to configure the resources of the first multicast or broadcast service for each of the at least one DU.

Accordingly, the CU configures the resources of the first multicast or broadcast service for each of the at least one DU according to the first information, the second information, and the received relevant information.

As can be seen from the above description, according to different information reported by the DU, the information collected by the CU is classified into the following four cases:

In the first case, the CU only receives the relevant information of the multicast and broadcast service that is expected to be received by the terminal and that is delivered by the DU without interpretation.

In the second case, the CU only receives the statistical result sent by the DU.

In the third case, the CU only receives the statistical result sent by the DU and the suggestion of the DU for the transmission mode of a certain multicast or broadcast service.

In the fourth case, the CU only receives the suggestion for the transmission mode of a certain service that is sent by the DU (for example, for a certain multicast or broadcast service, the network management device or the control unit other than the CU directly configure the resources required for multicast transmission).

For a certain multicast or broadcast service without configured resources, the CU performs statistics on the received information of the multicast or broadcast service that is expected to be received by the terminal, for example, within a set statistical period, the CU performs statistics with at least one of the multicast or broadcast service, an SSB and a cell as granularity, and obtains a decision of the CU for the transmission mode of the certain multicast or broadcast service. At this time, if the CU also receives the suggestion for the transmission mode sent by the DU, when making the decision, the CU also refers to the suggestion for the transmission mode sent by the DU. Exemplarily, assuming that there are four DUs under the CU, namely, DU1, DU2, DU3 and DU4, respectively. The DU 1 directly delivers the received relevant information of the UE to the CU without interpretation, and other DUs indicate transmission in a multicast mode based on the received relevant information of the UE, so that other DUs suggest transmission in a multicast mode. After the statistics of the CU, only 3% of the UE is expected to receive the multicast or broadcast service in a multicast mode (fewer terminals are not suitable for multicast transmission). At this time, other DUs suggest transmission in a multicast mode, so that the CU may decide to transmit the multicast or broadcast service in a multicast mode.

The CU performs unified processing on information sent by one or more DUs (belonging to the same CU) received within a certain time period (a preference statistical period configured by the CU), or also performs separate processing on each DU.

Specifically, unified processing refers to: summarize the information sent by all the DUs, and make a certain integration on the information, such as a request situation for a certain multicast or broadcast service, and summarization is performed within the coverage range of the CU to decide whether to transmit same in a PTM manner within the range. If the decision unit decides to transmit in a multicast mode (i.e., PTM) for a certain multicast or broadcast service satisfying the condition, same generates a corresponding identical configuration for the cell or beam under each DU under the CU, each configuration is associated with a multicast or service identifier.

Based on this, in an embodiment, the operation that the resources of the first multicast or broadcast service are configured for the DU by using the received relevant information includes the following operations.

Statistics is performed on the relevant information reported by the at least one DU to obtain a statistical result.

It is determined that the first multicast or broadcast service adopts a multicast transmission mode by using the statistical result.

The same resources are configured for the at least one DU for the first multicast or broadcast service.

That is, the statistical result is configured to determine that the first multicast or broadcast service adopts the multicast transmission mode. The same resources are configured for the at least one DU for the first multicast or broadcast service.

When making the decision, the total number of UE that is expected to receive the multicast or broadcast service, the number of UE under the SSB, the channel conditions, the first information, the second information, etc. need to be considered. Here, the first information represents the transmission mode suggested for the first multicast or broadcast service, and the second information represents the multicast area or broadcast area suggested for the first multicast or broadcast service.

The conditions are set as needed, for example, the number of UE applying for receiving the multicast or broadcast service through multicast is compared with a set threshold (set as needed). When the number of the UE is greater than or equal to the threshold, transmission is performed in a multicast mode. At the same time, the CU also considers the resource situation and checks whether there are enough radio resources, for example, if the current network load is higher, the remaining resources are fewer, and the network congestion may be caused without multicast, so that the network may select to transmit through the PTM.

Separate processing refers to: perform separate processing on the information sent by each DU. For each multicast or broadcast service, the decision unit decides the transmission mode separately according to the feedback of each DU, that is, in different DUs under the same CU, the same multicast or broadcast service may be sent by using one or more of multicast, unicast and broadcast, and then for the multicast or broadcast service using multicast or broadcast mode (i.e. PTM), the configuration thereof may be: 1) the decision unit configures a multicast resource pool with the CU or DU as granularity, and indicates a service list for performing multicast or broadcast, but the resource pool is not associated with the service, etc. and the DU decides how to transmit a plurality of services of a cell multicast service within a corresponding range thereof; and 2) the decision unit generates different configuration for the cell or beam under each CU or DU. During separate processing, when making the decision, it is necessary to consider the total number of the UE that is expected to receive the multicast or broadcast service under one DU, the number of the UE under the SSB (i.e., beam), the channel conditions, etc.

Based on this, in an embodiment, the operation that the resources of the first multicast or broadcast service are configured for the DU by using the received relevant information includes the following operations.

For each of the at least one DU, the resources of the first multicast or broadcast service are configured for the corresponding DU according to the relevant information of the first multicast or broadcast service of at least one terminal that is reported by the corresponding DU. The resources allocated by each DU are different.

That is, for each of the at least one DU, the relevant information of the first multicast or broadcast service of at least one terminal that is reported by the corresponding DU is used to configure the resources of the first multicast or broadcast service for the corresponding DU. The resources allocated to respective DUs are different.

In an embodiment, in a case where the first information sent by the DU is received, the resources of the first multicast or broadcast service are configured for the corresponding DU according to the first information and the relevant information of the first multicast or broadcast service of at least one terminal that is reported by the corresponding DU. The first information represents the transmission mode suggested for the first multicast or broadcast service.

In an embodiment, in a case where the second information is received, the resources of the first multicast or broadcast service are configured for the corresponding DU according to the first information, the second information, and the relevant information of the first multicast or broadcast service of at least one terminal that is reported by the corresponding DU. The second information represents the multicast area or broadcast area suggested for the first multicast or broadcast service.

In an embodiment, the method may further include the following operations.

Resource configuration information of a second multicast or broadcast service that is configured by a network element other than the CU and that is sent by the DU is received.

The received resource configuration information is combined to allocate the resources of the first multicast or broadcast service to the DU.

That is, the received resource configuration information and the relevant information are configured to allocate the resources of the first multicast or broadcast service to the DU.

In an embodiment, the operation that the resource configuration information of the second multicast or broadcast service that is configured by a network element other than the CU and that is sent by the DU is received includes the following operation.

The resource configuration information of the second multicast or broadcast service that is configured by the network element other than the CU and that is actively sent by the DU is received.

Alternatively, a request is sent to the DU. The resource configuration information of the second multicast or broadcast service that is configured by the network element other than the CU and that is which is sent by the DU in response to the request is received.

As can be seen from the above description, the number of terminals (which may be a number counted according to different granularity, such as CU granularity, DU granularity, or SSB granularity), other allocated resources and channel conditions, etc. need to be considered to allocate the resources to a certain multicast or broadcast service allocation resource. The CU may generate configuration of a certain multicast or broadcast service or provide a resource pool available for the multicast or broadcast service within a certain area range (CU or DU range).

In addition, for a multicast or broadcast service of a resource to be allocated, the CU needs to send the configuration information to the DU either in a unified processing mode or separate processing mode. The configuration information may contain, but is not limited to, one or more of the following contents: the content of a system information related to PTM delivery of the multicast or broadcast service, resource configuration (or an available resource pool) occupied by the transmission of the system information, the content contained in a multicast or broadcast service control channel and used resource information (or an available resource pool), multicast or broadcast service channel configuration information (or an available resource pool), etc.

The embodiments of the present disclosure provide a multicast or broadcast resource configuration method, as shown in FIG. 3, includes the following operations.

At S301, a terminal reports relevant information of a first multicast or broadcast service that is expected to be received to a DU.

At S302, the DU sends the received relevant information, that is reported by at least one terminal, of the first multicast or broadcast service that is expected to be received to a CU.

At S303, the CU sends resource configuration information of the first multicast or broadcast service to each DU.

Here, it is to be noted that the specific processing procedures of the terminal, the DU and the CU have been described in detail above and will not be elaborated here.

In the multicast or broadcast resource configuration method provided by the embodiments of the present disclosure, the terminal reports the relevant information of the first multicast or broadcast service that is expected to be received to the DU; the DU sends the received relevant information to the CU; the CU configures the resources of the first multicast or broadcast service for each of the at least one DU by using the received relevant information, and the DU receives the resource configuration information of the first multicast or broadcast service that is sent by the CU. The terminal reports the relevant information of the first multicast or broadcast service that is expected to be received to the DU, the DU sends the relevant information reported by the terminal to the CU, and the CU sends the resource configuration information of the multicast or broadcast service to each DU, so that the configuration of the resources of the multicast or broadcast service under a CU-DU architecture is implemented, and the resources of the multicast or broadcast service are configured based on the requests of the terminal for the multicast or broadcast service. In this way, the resource waste is reduced.

In addition, the DU sends first information to the CU, the first information representing a transmission mode suggested for the first multicast or broadcast service. The first information and the relevant information of the first multicast or broadcast service that is expected to be received by the at least one terminal and that is reported by the corresponding DU are used to configure the resources of the first multicast or broadcast service for the corresponding DU, and dynamic adjustment of a sending mode is performed based on the requests of the terminal for the multicast or broadcast service, thereby reducing the resource waste.

In addition, in a case where the transmission mode suggested for the first multicast or broadcast service is a multicast mode, second information is sent to the CU, the second information representing a multicast area or broadcast area suggested for the first multicast or broadcast service. The first information, the second information, and the relevant information of the first multicast or broadcast service that is expected to be received by the at least one terminal and that is reported by the corresponding DU are used to configure the resources of the first multicast or broadcast service for the corresponding DU, and dynamic adjustment of a sending area is performed based on the requests of the terminal for the multicast or broadcast service, thereby reducing the resource waste.

In practical application, a network management device or a control unit other than the CU directly configure resources required for transmission of the multicast or broadcast service, and at this time, the resources under the whole CU are reasonably scheduled based on the configuration information to avoid conflicts with the resources configured by the network management device or the control unit other than the CU. A corresponding system information, etc. may also be generated according to the content of the system information related to the PTM transmission mode of the multicast or broadcast service configured by the network management device or a control unit other than the CU.

Based on this, the embodiments of the present disclosure also provide an information transmission method, applied to a DU, including the following operation.

Configuration information (configured by a network element other than a CU, such as a network management device or a control unit other than the CU) associated with a configured multicast or broadcast service is sent to the CU. The configuration information is used by the CU to perform resource coordination.

In practical application, the configuration information contains, but is not limited to, the content of a system information related to PTM delivery of the multicast or broadcast service, resource configuration occupied by the transmission of the system information, the content contained in a multicast or broadcast service control channel and used resource information, multicast or broadcast service channel configuration information, etc.

When a decision unit is located on another hardware device independent from the CU, the CU needs to interact with the decision unit, and the decision unit configures the resources of the multicast or broadcast service and sends the configuration to the CU.

The DU selects to send all or part of the configuration information configured by the network element other than the CU to the CU. In addition, the sending process is actively initiated by the DU or requested by the CU.

Based on this, in an embodiment, the operation that the configuration information associated with the configured multicast or broadcast service is sent to the CU may include the following operation.

The configuration information is actively sent to the CU. Alternatively,
the configuration information is sent to the CU in response to a request of the CU.

Based on this, the embodiments of the present disclosure also provide an information transmission method, applied to a CU, as shown in FIG. 4, and the method includes the following operations.

At S401, configuration information associated with a multicast or broadcast service sent by a DU is received.

At S402, resource coordination is performed by using the configuration information.

In an embodiment, the specific implementation of S401 may include the following operation.

The configuration information actively sent by the DU is received.

Alternatively, a request is sent to the DU. The configuration information which is sent by the DU in response to the request is received.

The embodiments of the present disclosure also provide an information transmission method, as shown in FIG. 5, which includes the following operations.

At S501, a DU sends configuration information associated with a configured multicast or broadcast service to a CU.

At S502, the CU performs resource coordination by using the configuration information.

Here, it is to be noted that the specific processing procedures of the DU and the CU have been described in detail above and will not be elaborated here.

In the information transmission method provided by the embodiments of the present disclosure, the DU sends the configuration information associated with the configured multicast or broadcast service to the CU, and the CU performs resource coordination by using the configuration information, so that the dynamic adjustment of a sending mode and a sending area of the multicast or broadcast service is realized, thereby reducing the resource waste.

In order to implement the method of the embodiments of the present disclosure, the embodiments of the present disclosure also provide a multicast or broadcast resource configuration apparatus, which is arranged on a terminal, as shown in FIG. 6, and the apparatus includes: a reporting unit 601.

The reporting unit 601 is configured to report relevant information of a first multicast or broadcast service that is expected to be received to a DU, the reported relevant information is used by a CU to configure resources of the first multicast or broadcast service for the DU.

In an embodiment, as shown in FIG. 6, the apparatus may further include: a fourth receiving unit 602 and a determination unit 603.

The fourth receiving unit 602 is configured to receive a system information, the system information carrying at least one piece of multicast or broadcast service information.

The determination unit 603 is configured to determine a first multicast or broadcast service that is expected to be received by using the at least one piece of multicast or broadcast service information.

In an embodiment, the reporting unit 601 is configured to report the relevant information of the first multicast or broadcast service that is expected to be received to the DU in any one of the following manners:

an MAC CE;

physical layer signaling; or

RRC signaling.

In practical application, the reporting unit 601 and the fourth receiving unit 602 are implemented by a communication interface in the multicast or broadcast resource configuration apparatus. The determination unit 603 is implemented by a processor in the multicast or broadcast resource configuration apparatus.

Figure 7:
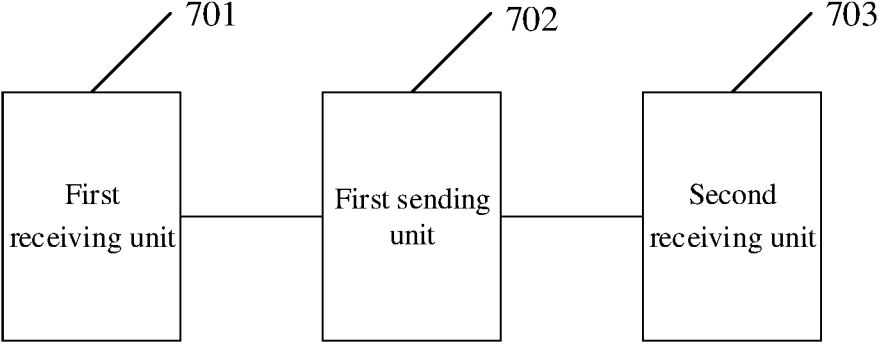
FIG. 7 is a schematic structural diagram of another multicast or broadcast resource configuration apparatus according to an embodiment of the present disclosure.

In order to implement the method on a DU side in the embodiments of the present disclosure, the embodiments of the present disclosure also provide a multicast or broadcast resource configuration apparatus, which is arranged on a DU, as shown in FIG. 7, and the apparatus includes: a first receiving unit 701, a first sending unit 702, and a second receiving unit 703.

The first receiving unit 701 is configured to receive relevant information, that is reported by at least one terminal, of a first multicast or broadcast service that is expected to be received.

The first sending unit 702 is configured to send the received relevant information to a CU, the relevant information sent is used by the CU to configure resources of the first multicast or broadcast service for the DU.

The second receiving unit 703 is configured to receive resource configuration information of the first multicast or broadcast service that is sent by the CU.

In an embodiment, the first receiving unit 701 is configured to receive the relevant information, that is reported by at least one terminal, of the first multicast or broadcast service that is expected to be received in any one of the following manners:

a MAC CE;

physical layer signaling; or

RRC signaling.

In an embodiment, the first sending unit 702 is configured to directly deliver the relevant information reported by the terminal to the CU with interpretation.

In an embodiment, the apparatus may further include: a statistical unit.

The statistical unit is configured to perform statistics on the received relevant information of the first multicast or broadcast service that is reported by the at least one terminal to obtain a statistical result.

The first sending unit 702 is configured to send the statistical result to the CU.

In an embodiment, the first sending unit 702 is configured to:

send first information to the CU when sending the received relevant information to the CU, the first information representing a transmission mode suggested for the first multicast or broadcast service.

In an embodiment, the first sending unit 702 is configured to:

in a case where the transmission mode suggested for the first multicast or broadcast service is a multicast mode, when sending the first information to the CU, send second information to the CU, the second information representing a multicast area or broadcast area suggested for the first multicast or broadcast service.

In an embodiment, the apparatus may further include: a broadcast unit.

The broadcast unit is configured to broadcast a system information, the system information carrying at least one piece of multicast or broadcast service information.

The first receiving unit 701 is configured to receive the relevant information of the first multicast or broadcast service that is reported by the at least one terminal based on the at least one piece of multicast or broadcast service information.

In an embodiment, the first sending unit 702 is also configured to:

send resource configuration information of a second multicast or broadcast service that is configured by a network element other than the CU to the CU, the resource configuration information sent is used by the CU to configure the resources of the first multicast or broadcast service for the DU.

In practical application, the first receiving unit 701, the first sending unit 702, the second receiving unit 703, and the broadcast unit are implemented by a communication interface in the multicast or broadcast resource configuration apparatus. The statistical unit is implemented by a processor in the multicast or broadcast resource configuration apparatus.

Figure 8:
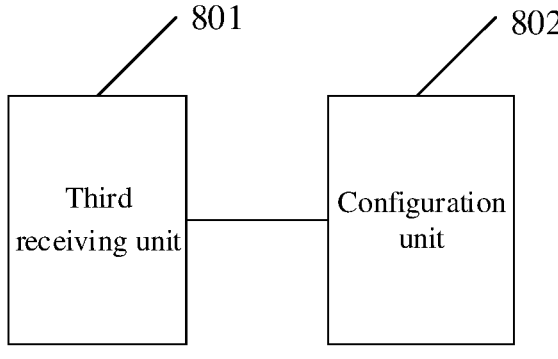
FIG. 8 is a schematic structural diagram of a third multicast or broadcast resource configuration apparatus according to an embodiment of the present disclosure.

In order to implement the method on a CU side in the embodiments of the present disclosure, the embodiments of the present disclosure also provide a multicast or broadcast resource configuration apparatus, which is arranged on a CU, as shown in FIG. 8, and the apparatus includes: a third receiving unit 801 and a configuration unit 802.

The third receiving unit 801 is configured to receive relevant information of a first multicast or broadcast service that is expected to be received by at least one terminal and that is reported by at least one DU.

The configuration unit 802 is configured to send resource configuration information of the first multicast or broadcast service to each DU.

In an embodiment, the configuration unit 802 is also configured to configure resources of the first multicast or broadcast service for each of the at least one DU by using the received relevant information.

The third receiving unit 801 is configured to receive, when receiving the relevant information, that is reported by the at least one DU, of the first multicast or broadcast service that is expected to be received by the at least one terminal, the relevant information of the first multicast or broadcast service that is reported by the terminal and that is delivered by the DU without interpretation.

In an embodiment, the third receiving unit 801 is also configured to:

receive a statistical result reported by the DU when receiving the relevant information, that is reported by the at least one DU, of the first multicast or broadcast service that is expected to be received by the at least one terminal, the statistical result is obtained by performing statistics on the relevant information of the first multicast or broadcast service that is reported by the at least one terminal.

In an embodiment, the third receiving unit 801 is also configured to:

receive first information sent by the DU when receiving the relevant information, that is reported by the at least one DU, of the first multicast or broadcast service that is expected to be received by the at least one terminal, the first information representing a transmission mode suggested for the first multicast or broadcast service.

Accordingly, the configuration unit 802 is used to configure the resources of the first multicast or broadcast service for each of the at least one DU according to the first information and the received relevant information.

In an embodiment, the third receiving unit 801 is also configured to:

in a case where the transmission mode suggested for the first multicast or broadcast service is a multicast mode, when the first information sent by the DU is received, receive second information sent by the DU, the second information representing a multicast area or broadcast area suggested for the first multicast or broadcast service.st service for each of the at least one DU.

Accordingly, the configuration unit 802 is used to configure the resources of the first multicast or broadcast service for each of the at least one DU according to the first information, the second information, and the received relevant information.

In an embodiment, the configuration unit 802 is configured to:

perform statistics on the relevant information reported by the at least one DU to obtain a statistical result;

determine that the first multicast or broadcast service adopts a multicast transmission mode by using the statistical result; and configure the same resources for the at least one DU for the first multicast or broadcast service.

In an embodiment, the configuration unit 802 is configured to:

for each of the at least one DU, configure the resources of the first multicast or broadcast service for the corresponding DU according to the relevant information of the first multicast or broadcast service of at least one terminal that is reported by the corresponding DU.

The resources allocated to respective DUs are different.

In an embodiment, the configuration unit 802 is configured to:

in a case where the first information sent by the DU is received, configure the resources of the first multicast or broadcast service for the corresponding DU according to the first information and the relevant information of the first multicast or broadcast service of at least one terminal that is reported by the corresponding DU, the first information representing the transmission mode suggested for the first multicast or broadcast service.

In an embodiment, the configuration unit 802 is configured to:

in a case where the second information is received, configure the resources of the first multicast or broadcast service for the corresponding DU according to the first information, the second information, and the relevant information of the first multicast or broadcast service of at least one terminal that is reported by the corresponding DU, the second information representing the multicast area or broadcast area suggested for the first multicast or broadcast service.

In an embodiment, the third receiving unit 801 is also configured to receive the resource configuration information of the second multicast or broadcast service that is configured by a network element other than the CU and that is sent by the DU.

In an embodiment, the configuration unit 802 is configured to combine the received resource configuration information to allocate the resources of the first multicast or broadcast service to the DU.

In practical application, the third receiving unit is implemented by a communication interface in the multicast or broadcast resource configuration apparatus. The configuration unit 802 is implemented by a processor in the multicast or broadcast resource configuration apparatus in combination with the communication interface.

It is to be noted that the multicast or broadcast resource configuration apparatus provided by the above embodiments is only exemplified by the division of the above program modules when performing multicast or broadcast resource configuration. In practical application, the above processing and allocation may be completed by different program modules as needed, that is, the internal structure of the apparatus is divided into different program modules to complete all or part of the above-described processing. In addition, the multicast or broadcast resource configuration apparatus provided by the above embodiments and the multicast or broadcast resource configuration method embodiment belong to the same concept, and the detailed implementation process thereof is detailed in the method embodiment and will not be elaborated here.

Figure 9:
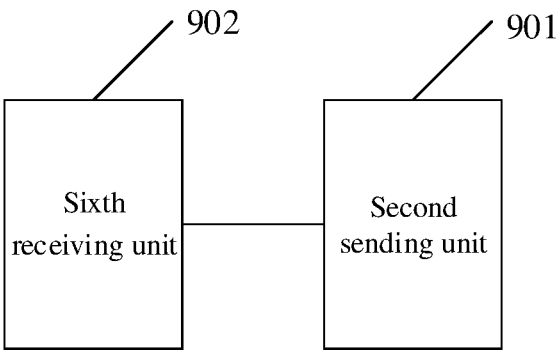
FIG. 9 is a schematic structural diagram of an information transmission apparatus according to an embodiment of the present disclosure.

In order to implement the method in the embodiments of the present disclosure, the embodiments of the present disclosure further provide an information transmission apparatus, which is arranged on a DU, as shown in FIG. 9, and the apparatus includes: a second sending unit 901.

The second sending unit 901 is configured to send configuration information associated with a configured multicast or broadcast service to a CU, the configuration information is used by the CU to perform resource coordination.

In an embodiment, the second sending unit 901 is configured to:

actively send the configuration information to the CU.

In an embodiment, as shown in FIG. 9, the apparatus may further include: a sixth receiving unit 902.

The sixth receiving unit 902 is configured to receive a request sent by the CU.

Accordingly, the second sending unit 901 is configured to send the configuration information to the CU based on the request of the CU.

In practical application, the second sending unit 901 is implemented by a processor in the information transmission apparatus in combination with a communication interface. The sixth receiving unit 902 is implemented by the communication interface in the information transmission apparatus.

Figure 10:
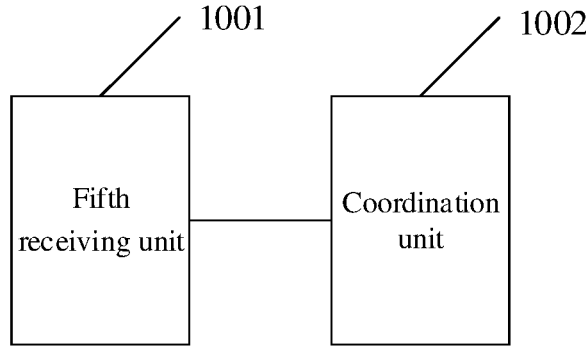
FIG. 10 is a schematic structural diagram of another information transmission apparatus according to an embodiment of the present disclosure.

In order to implement the method on a CU side in the embodiments of the present disclosure, the embodiments of the present disclosure further provide an information transmission apparatus, which is arranged on a CU, as shown in FIG. 10, and the apparatus includes: a fifth receiving unit 1001 and a coordination unit 1002.

The fifth receiving unit 1001 is configured to receive configuration information associated with a multicast or broadcast service sent by a DU.

The coordination unit 1002 is configured to perform resource coordination by using the configuration information.

In an embodiment, the apparatus may further include: a third sending unit.

The third sending unit is configured to send a request to the DU.

Accordingly, the fifth receiving unit 1001 is configured to receive the configuration information which is sent by the DU in response to the request.

In an embodiment, the fifth receiving unit 1001 is configured to receive the configuration information actively sent by the DU.

In practical application, the fifth receiving unit 1001 and the third sending unit are implemented by a communication interface in the information transmission apparatus.

The coordination unit 1002 is implemented by a processor in the information transmission apparatus.

It is to be noted that the information transmission apparatus provided by the above embodiments is only exemplified by the division of the above program modules when performing information transmission. In practical application, the above processing and allocation may be completed by different program modules as needed, that is, the internal structure of the apparatus is divided into different program modules to complete all or part of the above-described processing. In addition, the embodiments of the information transmission apparatus and the information transmission method provided by the embodiments belong to the same concept, and the detailed implementation processes thereof are detailed in the method embodiments and are not repeated here.

Figure 11:
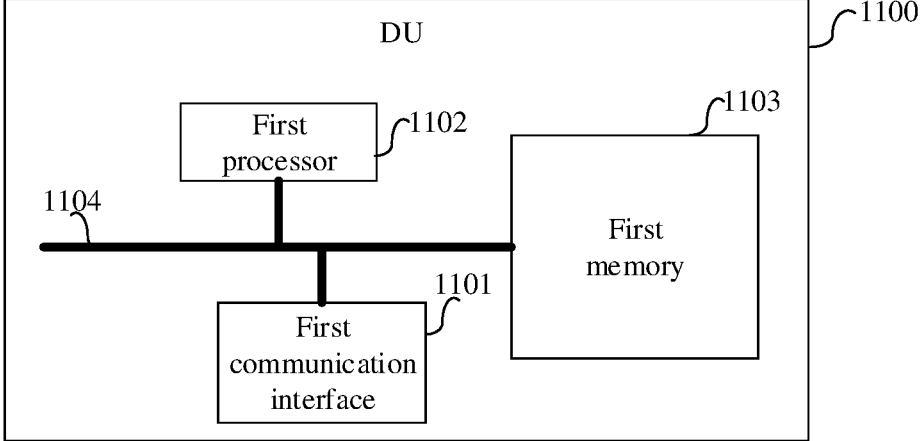
FIG. 11 is a schematic structural diagram of a DU according to an embodiment of the present disclosure.

Based on the hardware implementation of the above program modules, and in order to implement the method on a DU side of the embodiments of the present disclosure, the embodiments of the present disclosure also provide a DU, as shown in FIG. 11, the DU 1100 includes: a first communication interface 1101 and a first processor 1102.

The first communication interface 1101 is capable of performing information interaction with a CU and a terminal.

The first processor 1102 is connected with the first communication interface 1101 to implement information interaction with the CU and the terminal, and is configured to execute the method provided by one or more technical solutions on a DU device side when running a computer program. The computer program is stored on a first memory 1103.

Specifically, in the process of configuring the multicast or broadcast resource, the first communication interface 1101 is configured to:

receive relevant information, that is reported by at least one terminal, of a first multicast or broadcast service that is expected to be received; send the received relevant information to the CU, the relevant information sent is used by the CU to configure resources of the first multicast or broadcast service for the DU; and receive resource configuration information of the first multicast or broadcast service that is sent by the CU.

In an embodiment, the first communication interface 1101 is configured to receive the relevant information of the first multicast or broadcast service that is expected to be received and that is reported by the terminal in any one of the following manners:

an MAC CE;

physical layer signaling; or

RRC signaling.

In an embodiment, the first communication interface 1101 is configured to directly deliver the relevant information reported by the terminal to the CU without interpretation.

In an embodiment, the first processor 1102 is configured to perform statistics on the received relevant information of the first multicast or broadcast service that is reported by the at least one terminal to obtain a statistical result.

The first communication interface 1101 is configured to send the statistical result to the CU.

In an embodiment, the first communication interface 1101 is configured to:

send first information to the CU when sending the received relevant information to the CU, the first information representing a transmission mode suggested for the first multicast or broadcast service.

In an embodiment, the first communication interface 1101 is configured to:

in a case where the transmission mode suggested for the first multicast or broadcast service is a multicast mode, when sending the first information to the CU, send second information to the CU, the second information representing a multicast area or broadcast area suggested for the first multicast or broadcast service.

In an embodiment, the first communication interface 1101 is configured to broadcast a system information, the system information carrying at least one piece of multicast or broadcast service information.

The first communication interface 1101 is configured to receive the relevant information of the first multicast or broadcast service that is reported by the at least one terminal based on the at least one piece of multicast or broadcast service information.

In an embodiment, the first communication interface 1101 is also configured to:

send resource configuration information of a second multicast or broadcast service that is configured by a network element other than the CU to the CU, the sent resource configuration information is used by the CU to configure the resources of the first multicast or broadcast service for the DU.

In the process of performing information transmission, the first communication interface 1101 is configured to send configuration information associated with the configured multicast or broadcast service to the CU, the configuration information is used by the CU to perform resource coordination.

In an embodiment, the first communication interface 1101 is configured to:

actively send the configuration information to the CU.

In an embodiment, the first communication interface 1101 is also configured to:

receive a request sent by the CU; and accordingly, send the configuration information to the CU based on the request of the CU.

It is to be noted that the specific processing procedures of the first processor 1102 and the first communication interface 1101 may be understood with reference to the methods described above.

Of course, in practical application, various components in the DU 1100 are coupled together through a bus system 1104. It is understandable that the bus system 1104 is configured to implement connection communication between these components. In addition to the data bus, the bus system 1104 also includes a power bus, a control bus and a status signal bus. However, for clarity of illustration, the various buses are marked as the bus system 1104 in FIG. 11.

The first memory 1103 in the embodiments of the present disclosure is configured to store various types of data to support the operation of the DU 1100. Examples of these data include: any computer program configured to operate on the DU 1100.

The method disclosed in the above embodiments of the present disclosure may be applied to the first processor 1102 or implemented by the first processor 1102. The first processor 1102 may be an integrated circuit chip with signal processing capabilities. In an implementation process, each step of the method may be completed by an integrated logical circuit of hardware in the first processor 1102 or an instruction in a software form. The first processor 1102 described above may be a general-purpose processor, a Digital Signal Processor (DSP), or other programmable logic devices, discrete gates or transistor logic devices, discrete hardware components, etc. Various methods, steps, and logic block diagrams disclosed in the embodiments of the present disclosure may be implemented or executed by the first processor 1102. The general-purpose processor may be a microprocessor or any conventional processor, etc. The steps of the methods disclosed in combination with the embodiment of the present disclosure may be directly embodied as a hardware decoding processor for execution and completion, or a combination of hardware and software modules in the decoding processor for execution and completion. The software module may be located in a storage medium, which is located in the first memory 1103, and the first processor 1102 reads information in the first memory 1103, and completes the steps of the foregoing method in combination with hardware.

In an exemplary embodiment, the DU 1100 may be implemented by one or more Application Specific Integrated Circuits (ASICs), DSPs, Programmable Logic Devices (PLDs), Complex Programmable Logic Devices (CPLDs), Field-Programmable Gate Arrays (FPGAs), general-purpose processors, controllers, Micro Controller Units (MCUs), Microprocessors, or other electronic components, and is configured to execute the foregoing method.

Figure 12:
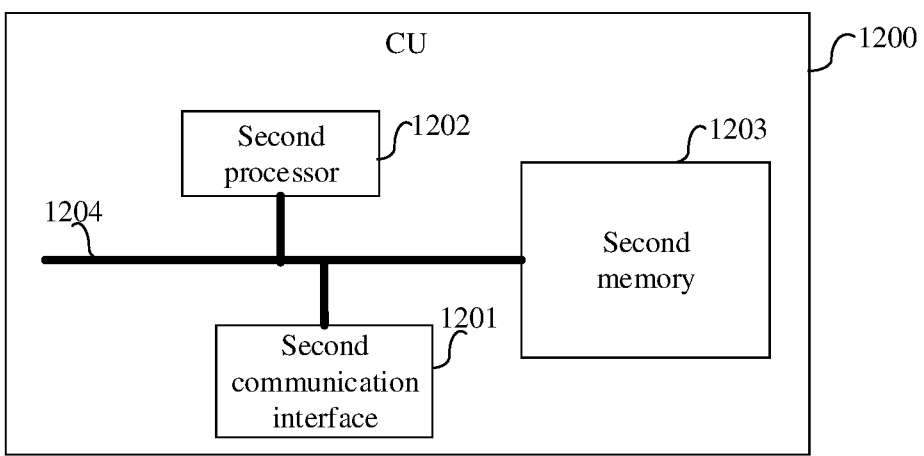
FIG. 12 is a schematic structural diagram of a CU according to an embodiment of the present disclosure.

Based on the hardware implementation of the above program modules, and in order to implement the method on a CU side of the embodiments of the present disclosure, the embodiments of the present disclosure also provide a CU, as shown in FIG. 12, the CU 1200 includes: a second communication interface 1201 and a second processor 1202.

The second communication interface 1201 is capable of performing information interaction with a DU.

The second processor 1202 is connected with the second communication interface 1201 to implement information exchange with the DU, and is configured to execute the method provided by one or more technical solutions on a CU side when running a computer program. The computer program is stored on a second memory 1203.

Specifically, in the process of configuring multicast or broadcast resources, the second communication interface 1201 is configured to receive relevant information of a first multicast or broadcast service that is expected to be received by at least one terminal and that is reported by at least one DU; and send resource configuration information of the first multicast or broadcast service to each DU.

In an embodiment, the second processor 1202 is configured to configure resources of the first multicast or broadcast service for each of the at least one DU by using the received relevant information through the second communication interface.

In an embodiment, the second communication interface 1201 is configured to receive, when receiving the relevant information, that is reported by the at least one DU, of the first multicast or broadcast service that is expected to be received by the at least one terminal, the relevant information of the first multicast or broadcast service that is reported by the terminal and that is delivered by the DU without interpretation.

In an embodiment, the second communication interface 1201 is configured to:

receive a statistical result reported by the DU when receiving the relevant information, that is reported by the at least one DU, of the first multicast or broadcast service that is expected to be received by the at least one terminal, the statistical result is obtained by performing statistics on the relevant information of the first multicast or broadcast service that is reported by the at least one terminal.

In an embodiment, the second communication interface 1201 is also configured to:

receive first information sent by the DU when receiving the relevant information, that is reported by the at least one DU, of the first multicast or broadcast service that is expected to be received by the at least one terminal, the first information representing a transmission mode suggested for the first multicast or broadcast service.

Accordingly, the second processor 1202 is used to configure the resources of the first multicast or broadcast service for each of the at least one DU according to the first information and the received relevant information.

In an embodiment, the second communication interface 1201 is also configured to:

in a case where the transmission mode suggested for the first multicast or broadcast service is a multicast mode, when the first information sent by the DU is received, receive second information sent by the DU, the second information representing a multicast area or broadcast area suggested for the first multicast or broadcast service.st service for each of the at least one DU.

Accordingly, the second processor 1202 is used to configure the resources of the first multicast or broadcast service for each of the at least one DU according to the first information, the second information, and the received relevant information.

In an embodiment, the second processor 1202 is configured to:

perform statistics on the relevant information reported by the at least one DU to obtain a statistical result;

determine that the first multicast or broadcast service adopts a multicast transmission mode by using the statistical result; and configure the same resources for the at least one DU for the first multicast or broadcast service.

In an embodiment, the second processor 1202 is configured to:

for each of the at least one DU, configure the resources of the first multicast or broadcast service for the corresponding DU according to the relevant information of the first multicast or broadcast service of at least one terminal that is reported by the corresponding DU.

The resources allocated to respective DUs are different.

In an embodiment, the second processor 1202 is configured to:

in a case where the first information sent by the DU is received, configure the resources of the first multicast or broadcast service for the corresponding DU according to the first information and the relevant information of the first multicast or broadcast service of at least one terminal that is reported by the corresponding DU, the first information representing the transmission mode suggested for the first multicast or broadcast service.

In an embodiment, the second processor 1202 is configured to:

in a case where the second information is received, configure the resources of the first multicast or broadcast service for the corresponding DU according to the first information, the second information, and the relevant information of the first multicast or broadcast service of at least one terminal that is reported by the corresponding DU, the second information representing the multicast area or broadcast area suggested for the first multicast or broadcast service.

In the process of performing information transmission, the second communication interface 1201 is configured to receive configuration information associated with a multicast or broadcast service sent by the DU. The second processor 1202 is configured to perform resource coordination by using the configuration information.

In an embodiment, the second communication interface 1201 is configured to send a request to the DU; and accordingly, receive the configuration information which is sent by the DU in response to the request.

In an embodiment, the second communication interface 1201 is configured to receive the configuration information actively sent by the DU.

It is to be noted that the specific processing procedures of the second processor 1202 and the second communication interface 1201 may be understood with reference to the methods described above.

Of course, in practical application, various components in the CU 1200 are coupled together through a bus system 1204. It is understandable that the bus system 1204 is configured to implement connection communication between these components. In addition to the data bus, the bus system 1204 also includes a power bus, a control bus and a status signal bus. However, for clarity of illustration, the various buses are marked as the bus system 1204 in FIG. 12.

The second memory 1203 in the embodiments of the present disclosure is configured to store various types of data to support the operation of the CU 1200. Examples of these data include: any computer program configured to operate on the CU 1200.

The method disclosed in the above embodiments of the present disclosure may be applied to the second processor 1202 or implemented by the second processor 1202. The second processor 1202 may be an integrated circuit chip with signal processing capabilities. In an implementation process, each step of the method may be completed by an integrated logical circuit of hardware in the second processor 1202 or an instruction in a software form. The second processor 1202 described above may be a general-purpose processor, a DSP, or other programmable logic devices, discrete gates or transistor logic devices, discrete hardware components, etc. Various methods, steps, and logic block diagrams disclosed in the embodiments of the present disclosure may be implemented or executed by the second processor 1202. The general-purpose processor may be a microprocessor or any conventional processor, etc. The steps of the methods disclosed in combination with the embodiment of the present disclosure may be directly embodied as a hardware decoding processor for execution and completion, or a combination of hardware and software modules in the decoding processor for execution and completion. The software module may be located in a storage medium, which is located in the second memory 1203, and the second processor 1202 reads information in the second memory 1203, and completes the steps of the foregoing method in combination with hardware.

In an exemplary embodiment, the CU 1000 may be implemented by one or more ASICS, DSPs, PLDs, CPLDs, FPGAs, general-purpose processors, controllers, MCUs, Microprocessors, or other electronic components, and is configured to execute the foregoing method.

Figure 13:
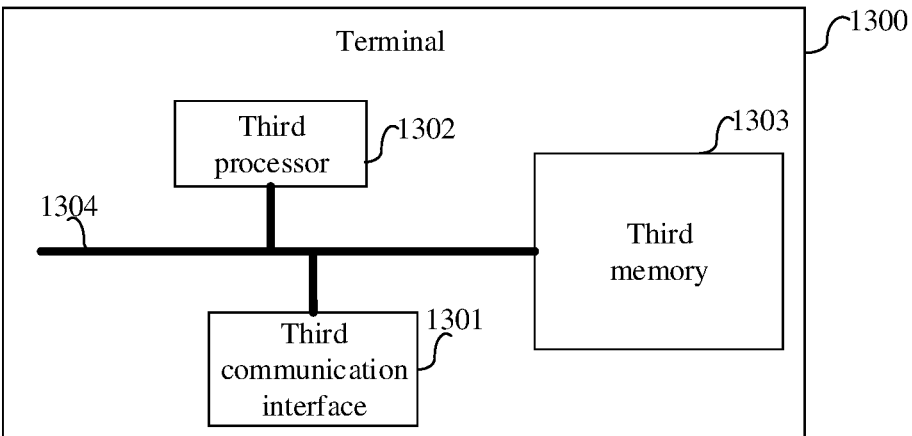
FIG. 13 is a schematic structural diagram of a terminal according to an embodiment of the present disclosure.

Based on the hardware implementation of the above program modules, and in order to implement the method on a terminal side of the embodiments of the present disclosure, the embodiments of the present disclosure also provide a terminal, as shown in FIG. 13, the terminal 1300 includes: a third communication interface 1301 and a third processor 1302.

The third communication interface 1301 is capable of performing information interaction with a DU.

The third processor 1302 is connected with the third communication interface 1301 to implement information exchange with the DU, and is configured to execute the method provided by one or more technical solutions on a terminal side when running a computer program. The computer program is stored on a third memory 1303.

Specifically, the third communication interface 1301 is configured to report relevant information of a first multicast or broadcast service that is expected to be received to a DU, the reported relevant information is used by a CU to configure resources of the first multicast or broadcast service for the DU.

In an embodiment, the third communication interface 1301 is configured to broadcast a system information, the system information carrying at least one piece of multicast or broadcast service information.

The third processor 1301 is configured to determine the first multicast or broadcast service that is expected to be received by using the at least one piece of multicast or broadcast service information.

In an embodiment, the third communication interface 1301 is configured to report the relevant information of the first multicast or broadcast service that is expected to be received to the DU in any one of the following manners:

a MAC CE;

physical layer signaling; or

RRC signaling.

It is to be noted that the specific processing procedures of the third processor 1302 and the third communication interface 1301 may be understood with reference to the methods described above.

Of course, in practical application, various components in the terminal 1300 are coupled together through a bus system 1304. It is understandable that the bus system 1304 is configured to implement connection communication between these components. In addition to the data bus, the bus system 1304 also includes a power bus, a control bus and a status signal bus. However, for clarity of illustration, the various buses are marked as the bus system 1304 in FIG. 13.

The third memory 1303 in the embodiments of the present disclosure is configured to store various types of data to support the operation of the terminal 1300. Examples of these data include: any computer program configured to operate on the terminal 1300.

The method disclosed in the above embodiments of the present disclosure may be applied to the third processor 1302 or implemented by the third processor 1302. The third processor 1302 may be an integrated circuit chip with signal processing capabilities. In an implementation process, each step of the method may be completed by an integrated logical circuit of hardware in the third processor 1302 or an instruction in a software form. The third processor 1302 described above may be a general-purpose processor, a DSP, or other programmable logic devices, discrete gates or transistor logic devices, discrete hardware components, etc. Various methods, steps, and logic block diagrams disclosed in the embodiments of the present disclosure may be implemented or executed by the third processor 1302. The general-purpose processor may be a microprocessor, or any conventional processor. The steps of the methods disclosed in combination with the embodiment of the present disclosure may be directly embodied as a hardware decoding processor for execution and completion, or a combination of hardware and software modules in the decoding processor for execution and completion. The software module may be located in a storage medium, which is located in the third memory 1303, and the third processor 1302 reads information in the third memory 1303, and completes the steps of the foregoing method in combination with hardware.

In an exemplary embodiment, the terminal 1300 may be implemented by one or more ASICs, DSPs, PLDs, CPLDs, FPGAs, general-purpose processors, controllers, MCUs, Microprocessors, or other electronic components, and is configured to execute the foregoing method.

It is understandable that the memories (the first memory 1103, the second memory 1203 and the third memory 1303) in the embodiments of the present disclosure may be volatile memories or nonvolatile memories, and may also include both volatile and nonvolatile memories. Herein, the nonvolatile memory may be a Read Only Memory (ROM), a Programmable ROM (PROM), an Erasable PROM (EPROM), an Electrically EPROM (EEPROM), a Ferromagnetic Random Access Memory (FRAM), a Flash Memory, a magnetic surface memory, an optical disk, or a Compact Disc-ROM (CD-ROM). The magnetic surface memory may be a magnetic disk memory or a magnetic tape memory. The volatile memory may be a Random Access Memory (RAM), which is used as an external cache. By way of example, but not limitation, many forms of RAM are available, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memories described in the embodiments of the present disclosure are intended to include, but not be limited to, these and any other suitable types of memories.

Figure 14:
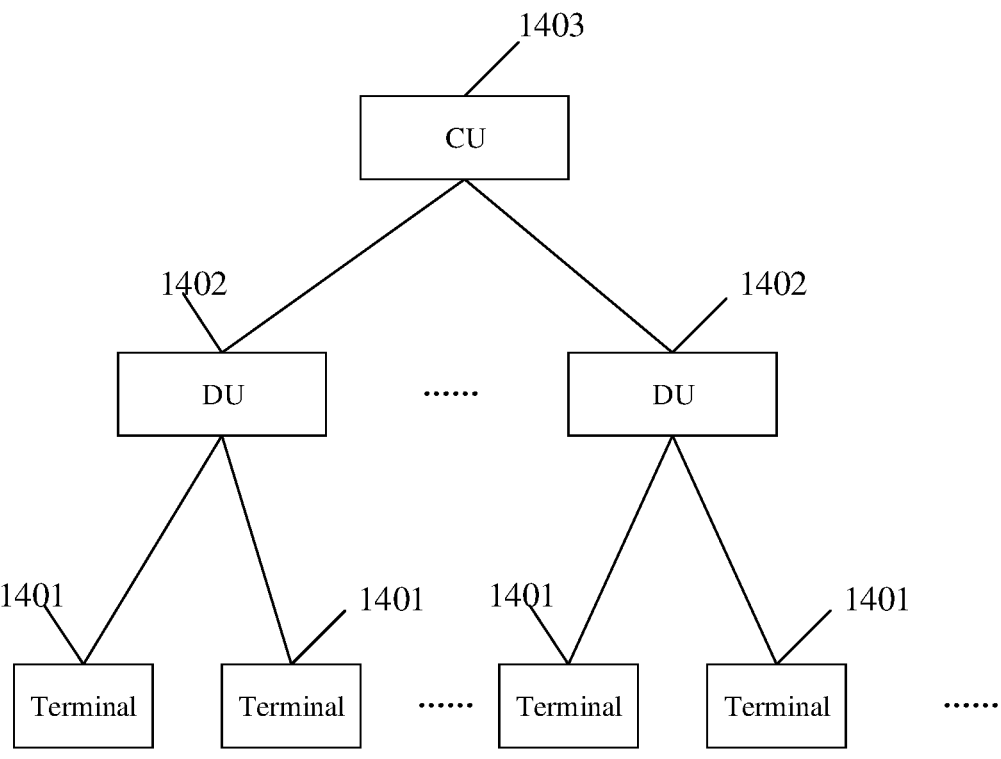
FIG. 14 is a schematic structural diagram of a multicast or broadcast resource configuration system according to an embodiment of the present disclosure.

The embodiments of the present disclosure also provide a multicast or broadcast resource configuration system, as shown in FIG. 14, which includes: at least one terminal 1401, at least one DU 1402 and a CU 1403.

It is to be noted that the specific processing procedures of the terminal 1401, the DU 1402 and the CU 1403 have been described in detail above and will not be elaborated here.

Figure 15:
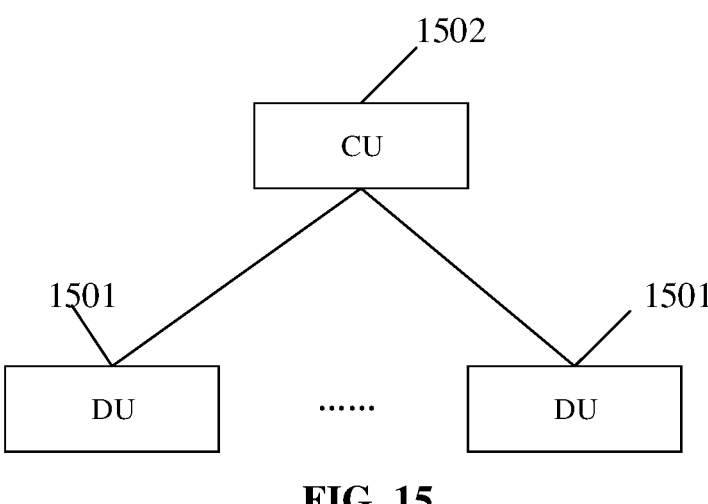
FIG. 15 is a schematic structural diagram of an information transmission system according to an embodiment of the present disclosure.

The embodiments of the present disclosure also provide an information transmission system, as shown in FIG. 15, which includes: at least one DU 1501 and a CU 1502.

It is to be noted that the specific processing procedures of the DU 1501 and the CU 1502 have been described in detail above and will not be elaborated here.

In the exemplary embodiment, the embodiments of the present disclosure also provide a storage medium, that is, a computer storage medium, specifically a computer readable storage medium, for example, a first memory 1103 including a stored computer program executed by a first processor 1102 of a DU 1100 to perform the steps of the above method on a CU side, for another example, a second memory 1203 including a stored computer program executed by a second processor 1202 of a CU 1200 to perform the steps of the above method on a DU side, and for yet another example, a third memory 1303 including a stored computer program executed by a third processor 1302 of a terminal 1300 to perform the steps of the method on a terminal side. The computer readable storage medium may be the memory such as the FRAM, the ROM, the PROM, the EPROM, the EEPROM, the Flash Memory, the magnetic surface memory, the optical disk, or CD-ROM.

It is to be noted that the terms "first", "second" and the like are used to distinguish similar objects, and are not necessarily used to describe a specific order or sequence.

In addition, the technical solutions described in the embodiments of the present disclosure may be arbitrarily combined without conflict.

The description above is only the preferred embodiment of the present disclosure and is not intended to limit the scope of protection of the present disclosure.

What is claimed is:

1. A multicast or broadcast resource configuration method, applied to a Distributed Unit (DU), comprising:

receiving relevant information, that is reported by at least one terminal, of a first multicast or broadcast service that is expected to be received;

sending the received relevant information to a Centralized Unit (CU), wherein the sent relevant information is used to configure resources of the first multicast or broadcast service for the DU; and receiving resource configuration information, that is sent by the CU, of the first multicast or broadcast service, wherein the method further comprises:

broadcasting a system information, the system information carrying at least one piece of multicast or broadcast service information; and receiving the relevant information of the first multicast or broadcast service that is reported by the at least one terminal based on the at least one piece of multicast or broadcast service information, and wherein the relevant information comprises:

an identification of the first multicast or broadcast service;

a location of the terminal; and a receiving mode preference, wherein sending the relevant information to the CU comprises:

directly delivering the relevant information reported by the terminal to the CU without interpretation for performing statistics on the relevant information to obtain a statistical result, wherein when sending the received relevant information to the CU, the method further comprises:

sending first information to the CU, the first information representing a transmission mode suggested for the first multicast or broadcast service, wherein in a case where the transmission mode suggested for the first multicast or broadcast service is a multicast mode, when sending the first information to the CU, the method further comprises:

sending second information to the CU, the second information representing a multicast area or broadcast area suggested for the first multicast or broadcast service, wherein the statistical result, a number of terminals under a Synchronization Signal Block (SSB), channel conditions, the first information and the second information are together used for determining that the first multicast or broadcast service adopts the multicast mode.

2. The method of claim 1, wherein the relevant information, that is reported by the terminal, of the first multicast or broadcast service that is expected to be received is received in one of following manners:

a Media Access Control Control Element (MAC CE);
physical layer signaling; or
Radio Resource Control (RRC) signaling.

3. The method of claim 1, further comprising:

sending resource configuration information, that is configured by a network element other than the CU, of a second multicast or broadcast service to the CU, wherein the sent resource configuration information is used by the CU to configure the resources of the first multicast or broadcast service for the DU.

4. A Distributed Unit (DU), comprising: a first processor and a first memory configured to store a computer program executable on the processor, wherein the first processor is configured to execute the steps of the method of claim 1.

5. A multicast or broadcast resource configuration method, applied to a Centralized Unit (CU), comprising:

receiving relevant information, that is reported by at least one Distributed Unit (DU), of a first multicast or broadcast service that is expected to be received by at least one terminal;

configuring resources of the first multicast or broadcast service for each of the at least one DU using the received relevant information; and sending resource configuration information of the first multicast or broadcast service to each DU, wherein the relevant information of the first multicast or broadcast service is reported by the at least one terminal based on at least one piece of multicast or broadcast service information, and the at least one piece of multicast or broadcast service information is carried in a system information broadcast by the at least one DU, and wherein the relevant information comprises at least one of:

an identification of the first multicast or broadcast service;
a location of the terminal; and
a receiving mode preference, wherein when the relevant information, that is reported by the at least one DU, of the first multicast or broadcast service that is expected to be received by the at least one terminal is received, the method comprises:

receiving the relevant information of the first multicast or broadcast service that is reported by the terminal and that is delivered by the DU without interpretation, wherein when receiving the relevant information, that is reported by the at least one DU, of the first multicast or broadcast service that is expected to be received by the at least one terminal, the method further comprises:

receiving first information sent by the DU, the first information representing a transmission mode suggested for the first multicast or broadcast service, wherein in a case where the transmission mode suggested for the first multicast or broadcast service is a multicast mode, when receiving the first information sent by the CU, the method further comprises:

receiving second information sent by the DU, the second information representing a multicast area or broadcast area suggested for the first multicast or broadcast service, wherein statistics is performed on the relevant information reported by the at least one DU to obtain a statistical result, wherein the statistical result, a number of terminals under a Synchronization Signal Block (SSB), channel conditions, the first information and the second information are together used for determining that the first multicast or broadcast service adopts the multicast mode.

6. The method of claim 5, wherein for each of the at least one DU, the relevant information of the first multicast or broadcast service of at least one terminal that is reported by a corresponding DU is used to configure the resources of the first multicast or broadcast service for the corresponding DU; wherein the resources of the first multicast or broadcast service configured for each of the at least one DU are different.

7. A Centralized Unit (CU), comprising: a second processor and a second memory configured to store a computer program executable on the processor, wherein the second processor is configured to execute the steps of the method of claim 5.

* * * * *